United States Patent
Park et al.

(10) Patent No.: US 9,802,207 B2
(45) Date of Patent: Oct. 31, 2017

(54) AIR CONDITIONING APPARATUS (71) Applicant: LG ELECTRONICS INC., Seoul (KR)

(72) Inventors: Chulwoo Park, Seoul (KR); Hojung Kim, Seoul (KR); Yanghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 14/596,713

(22) Filed: Jan. 14, 2015

(65) Prior Publication Data

US 2015/0196925 A1    Jul. 16, 2015

(30) Foreign Application Priority Data

Jan. 14, 2014 (KR) .......................... 10-2014-0004311

(51) Int. Cl.
*B03C 3/155* (2006.01)
*F24F 3/16* (2006.01)

(52) U.S. Cl.
CPC ............ *B03C 3/155* (2013.01); *F24F 3/1603* (2013.01); *F24F 3/166* (2013.01); *F24F 2003/1635* (2013.01); *F24F 2003/1639* (2013.01)

(58) Field of Classification Search
CPC .. F24F 3/166; F24F 3/1603; F24F 2003/1639; F24F 2003/1635; B03C 3/155; B03C 3/60–3/64
See application file for complete search history.

(56) References Cited

U.S. PATENT DOCUMENTS

| | | | | | |
|---|---|---|---|---|---|
| 2,709,954 | A | * | 6/1955 | Baker | B25H 1/20 108/50.13 |
| 2,817,413 | A | * | 12/1957 | McDonald | B03C 3/47 96/79 |
| 2,978,066 | A | * | 4/1961 | Nodolf | B03C 3/45 96/87 |
| 3,271,932 | A | * | 9/1966 | Newell | B03C 3/155 55/491 |
| 4,166,729 | A | * | 9/1979 | Thompson | B03C 3/60 96/79 |

(Continued)

FOREIGN PATENT DOCUMENTS

| CN | 1576731 A | 2/2005 |
|---|---|---|
| CN | 101623576 A | 1/2010 |

(Continued)

*Primary Examiner* — Amber R Orlando
*Assistant Examiner* — Britanny Precht
(74) *Attorney, Agent, or Firm* — Dentons US LLP (57) ABSTRACT

Provided is an air conditioning apparatus. The air conditioning apparatus includes a main body having a suction part through which air is suctioned and a discharge part through which the air suctioned through the suction part is discharged, a fan disposed within the main body to allow the air to flow, a filter device disposed between the suction part and the discharge part within the main body, the filter device including a filter including a plurality of arrays that are spaced apart from each other, and a power supply part to supply a voltage to each of the arrays. Each of the arrays includes a conductive member, the conductive member contacts a dielectric containing a dielectric material.

8 Claims, 8 Drawing Sheets

(56) References Cited

U.S. PATENT DOCUMENTS

| | | | | |
|---|---|---|---|---|
| 5,445,798 | A * | 8/1995 | Ikeda | A23L 3/3409 261/DIG. 42 |
| 6,129,781 | A | 10/2000 | Okamoto et al. | |
| 6,494,934 | B2 * | 12/2002 | Fukushima | B03C 3/12 95/63 |
| 6,749,669 | B1 * | 6/2004 | Griffiths | B03C 3/14 55/DIG. 38 |
| 7,332,019 | B2 * | 2/2008 | Bias | B03C 3/025 96/15 |
| 7,601,204 | B2 * | 10/2009 | Woodruff | B03C 3/017 95/73 |
| 2004/0065203 | A1 * | 4/2004 | Rosenberg | B03C 3/64 96/69 |
| 2004/0253417 | A1 * | 12/2004 | Sekoguchi | A47L 7/04 428/195.1 |
| 2005/0082160 | A1 * | 4/2005 | Botvinnik | A61L 9/22 204/164 |
| 2006/0018807 | A1 * | 1/2006 | Taylor | A61L 9/22 422/186.3 |
| 2006/0018811 | A1 * | 1/2006 | Taylor | B01D 53/32 422/186.04 |
| 2007/0039462 | A1 * | 2/2007 | Helt | B03C 3/12 95/6 |
| 2007/0039472 | A1 * | 2/2007 | Bias | B03C 3/025 96/66 |
| 2008/0170971 | A1 * | 7/2008 | Bergeron | A61L 9/205 422/171 |

FOREIGN PATENT DOCUMENTS

| | | |
|---|---|---|
| CN | 102596265 A | 7/2012 |
| DE | 3915248 A1 | 11/1990 |
| EP | 1612900 A1 | 1/2006 |
| EP | 1647776 A2 | 4/2006 |
| KR | 10-2005-0015466 A | 2/2005 |

* cited by examiner

AIR CONDITIONING APPARATUS

CROSS-REFERENCE TO RELATED APPLICATIONS

The present application claims priority under 35 U.S.C. 119 and 35 U.S.C. 365 to Korean Patent Application No. 10-2014-0004311 (filed on Jan. 14, 2014), which is hereby incorporated by reference in its entirety.

BACKGROUND

The present disclosure relates to an air conditioning apparatus.

In general, air conditioning apparatuses are apparatuses for cooling, heating, or purifying indoor air.

Such an air conditioning apparatus may include an air conditioner for cooling or heating an indoor space, a heat pump for heating an indoor space, and an air cleaner for purifying indoor air.

Korean Patent Publication No. 2005-0015466 (Published Date: Feb. 21, 2005) discloses a wet or dry combination type air cleaner having a self-cleaning function.

The air cleaner may be configured to sterilize polluted air introduced through an air passage or collect dusts contained in the polluted air while the polluted air passes through a UV lamp and filter. Here, the filter may be formed of a material that is capable of washing filter. When an amount of fine dusts is attached to the filter, a wet scrubber rotatably disposed in a passage through which air passes may be rotate to switch a spraying direction of the scrubber toward the filter, thereby cleaning pollutants collected on the filter.

However, in to the air cleaner according to the related art, the spraying method may be used for the self-cleaning function. Thus, since a water supply device and a spraying device are provided for the spraying method, the whole system may increase in volume. In addition, even though the filter is autonomously cleaned, since water used for spraying has to be frequently replaced, a user may be cumbersome.

SUMMARY

Embodiments provide an air conditioning apparatus in which a filter is automatically cleaned. In one embodiment, an air conditioning apparatus comprises: a main body having a suction part and a discharge part, air being suctioned through the suction part and discharged through the discharge part; a fan within the main body to allow the air to flow; a filter device between the suction part and the discharge part within the main body, the filter device comprising an array of filter elements separated from each other; and a power supply to supply a voltage to at least some of the filter elements, wherein each of the filter elements comprises a conductive member, the conductive member contacts a dielectric containing a dielectric material, the power supply supplies a first voltage having a first frequency to the at least some of the filter elements to filter dust, and the power supply supplies a second voltage having a second frequency higher than the first frequency to the filter elements for cleaning.

In another embodiment, an air conditioning apparatus includes: a main body having a suction part through which air is suctioned and a discharge part through which the air suctioned through the suction part is discharged; a fan disposed within the main body to allow the air to flow; a filter device disposed between the suction part and the discharge part within the main body, the filter device comprising a filter comprising a plurality of arrays that are spaced apart from each other; and a power supply part to supply a voltage to each of the arrays, wherein each of the arrays comprises a conductive member, the conductive member contacts a dielectric containing a dielectric material, the power supply part supplies a voltage having a first frequency to the filter to allow the filter to filter dusts, and when cleaning of the filter is needed, the power supply part supplies a voltage having a second frequency higher than the first frequency to the filter.

In another embodiment, an air conditioning apparatus includes: a main body having a suction part through which air is suctioned and a discharge part through which the air suctioned through the suction part is discharged; a fan disposed within the main body to allow the air to flow; a filter device disposed between the suction part and the discharge part within the main body, the filter device comprising a filter comprising a plurality of arrays that are spaced apart from each other; and a power supply part to supply a voltage to each of the arrays, wherein each of the arrays comprises a conductive member and a dielectric layer formed by coating a dielectric material to the conductive member, and the power supply part supplies a voltage having a frequency of about 1 Khz or more to filter so as to clean the filter.

In further another embodiment, an air conditioning apparatus includes: a main body having a suction part through which air is suctioned and a discharge part through which the air suctioned through the suction part is discharged; a fan disposed within the main body to allow the air to flow; a filter device disposed between the suction part and the discharge part within the main body, the filter device comprising a filter comprising a plurality of arrays that are spaced apart from each other; and a power supply part to supply a voltage to each of the arrays, wherein each of the arrays comprises a conductive member, a plurality of dielectric tubes containing a dielectric material are disposed between the arrays, and the power supply part supplies a voltage having a frequency of about 1 Khz or more so as to clean the filter.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Hereinafter, an air conditioning apparatus that is capable of cooling or heating indoor air will be exemplified.

Figure 1:
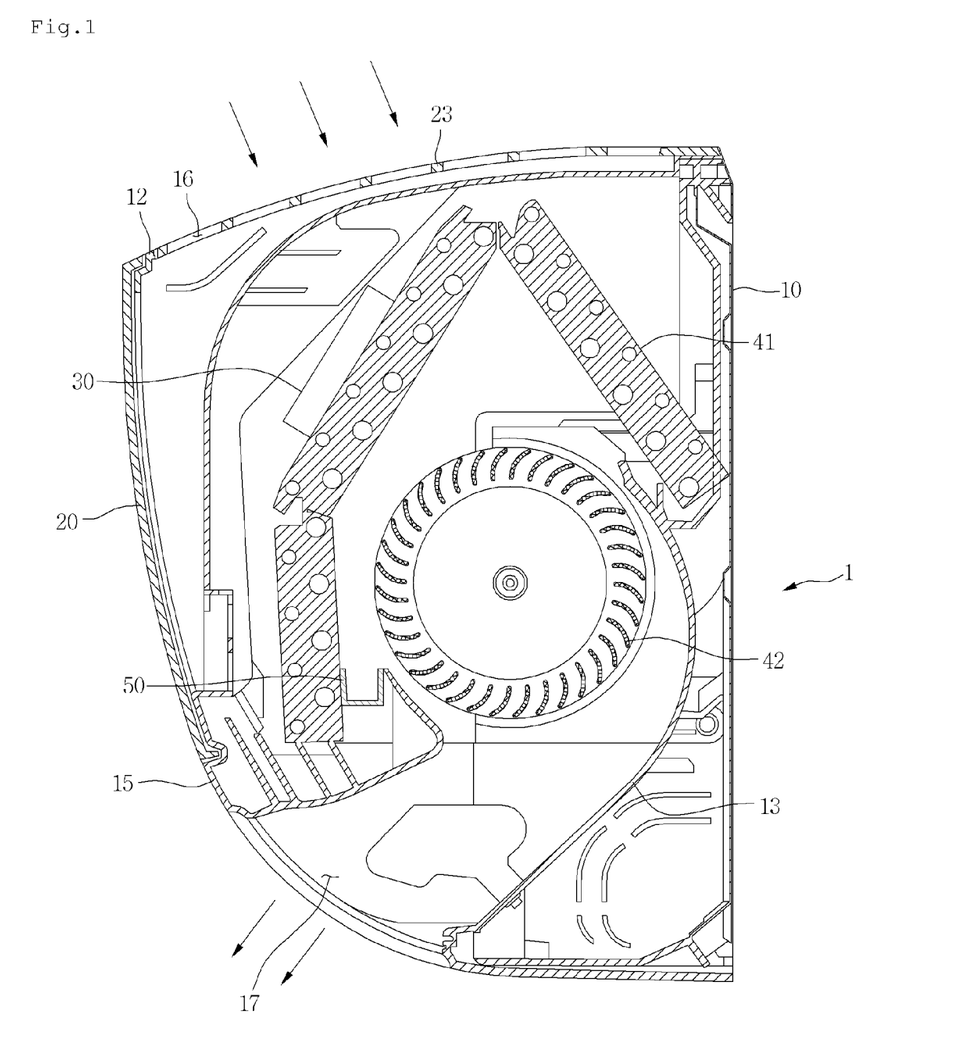
FIG. 1 is a schematic view of an air conditioning apparatus according to a first embodiment.

FIG. 1 is a schematic view of an air conditioning apparatus according to a first embodiment.

Referring to FIG. 1, an air conditioning apparatus 1 according to a first embodiment may include an indoor unit and an outdoor unit. FIG. 1 illustrates constitutions of the indoor unit.

Referring to FIG. 1, the air conditioning apparatus 1 includes a main body 10 in which a plurality of parts are accommodated.

The main body 10 may include a front frame 12 and a rear frame 13 which define an exterior of the main body 10. When the front frame 12 and the rear frame 13 are coupled to each other in a front/rear direction, a space in which various parts such as an indoor unit heat exchanger 41 and a fan 42, which are described later, are installed is defined between the front frame 12 and the rear frame 13.

The main body may further include a front panel 20 disposed on a front surface of the front frame 12 to define a front exterior of the main body 10. Here, the front panel 20 may be rotatably coupled to the front frame 12.

The main body 10 may have a suction part 16 through which indoor air is suctioned and a discharge part 17 through which the suctioned indoor air is discharged into an indoor space. The suction part 16 may be defined in a top surface of the main body, and the discharge part 17 may be defined in each of front and bottom surfaces of the main body, but are not limited thereto. That is, the present disclosure is not limited to positions of the suction part 16 and the discharge part 17.

The main body 10 may further include a filter device 30 for filtering the air suctioned through the suction part 16, the indoor heat exchanger 41 in which the indoor air is heat-exchanged with a refrigerant, a fan 42 to allow the indoor air to forcibly flow, and a discharge grill part 15 for guiding the discharge of the indoor air that is heated-exchanged with the refrigerant.

A portion or the whole of the indoor heat exchanger 41 may be disposed to be inclined within the main body 10. The indoor heat exchanger 41 may be constituted by a plurality of heat exchangers that are connected to each other. Alternatively, the indoor heat exchanger 41 may be provided as a single heat exchanger that is bent several times.

The filter device 30 may be disposed between the suction part 16 and the indoor heat exchanger 41 to collect dusts, thereby removing dusts contained in air. For example, the filter device 30 may be disposed in the indoor heat exchanger 41. Alternatively, the filter device 30 may be disposed on one surface of the front frame 12 having the suction part within the main body 10.

For example, the filter device 30 may be coupled to the indoor heat exchanger 41 or the front frame 12 in a hook manner, but the present disclosure is not limited to the coupling structure of the filter device 30.

The discharge grill part 15 may support the indoor heat exchanger 41. A dust storage part 50 for collecting dust particles removed from the filter device 30 may be coupled to the filter device 30. Alternatively, the discharge grill part 15 may define the dust storage part 50. Alternatively, the dust storage part 50 may be coupled to an upstream or downstream side of the indoor heat exchanger 40 with respect to a flow of the air. For example, the dust storage part 50 may be coupled to the indoor heat exchanger 40.

To collect the dusts removed from the filter device 30 into the dust storage part 50, the dust storage part 50 may be disposed under the filter device 30. For another example, the dust storage part 50 may be coupled to a lower portion of the filter device 30, or a portion of the filter device 30 may be defined as the dust storage part 50.

Hereinafter, the filter device 30 may be described in detail.

Figure 2:
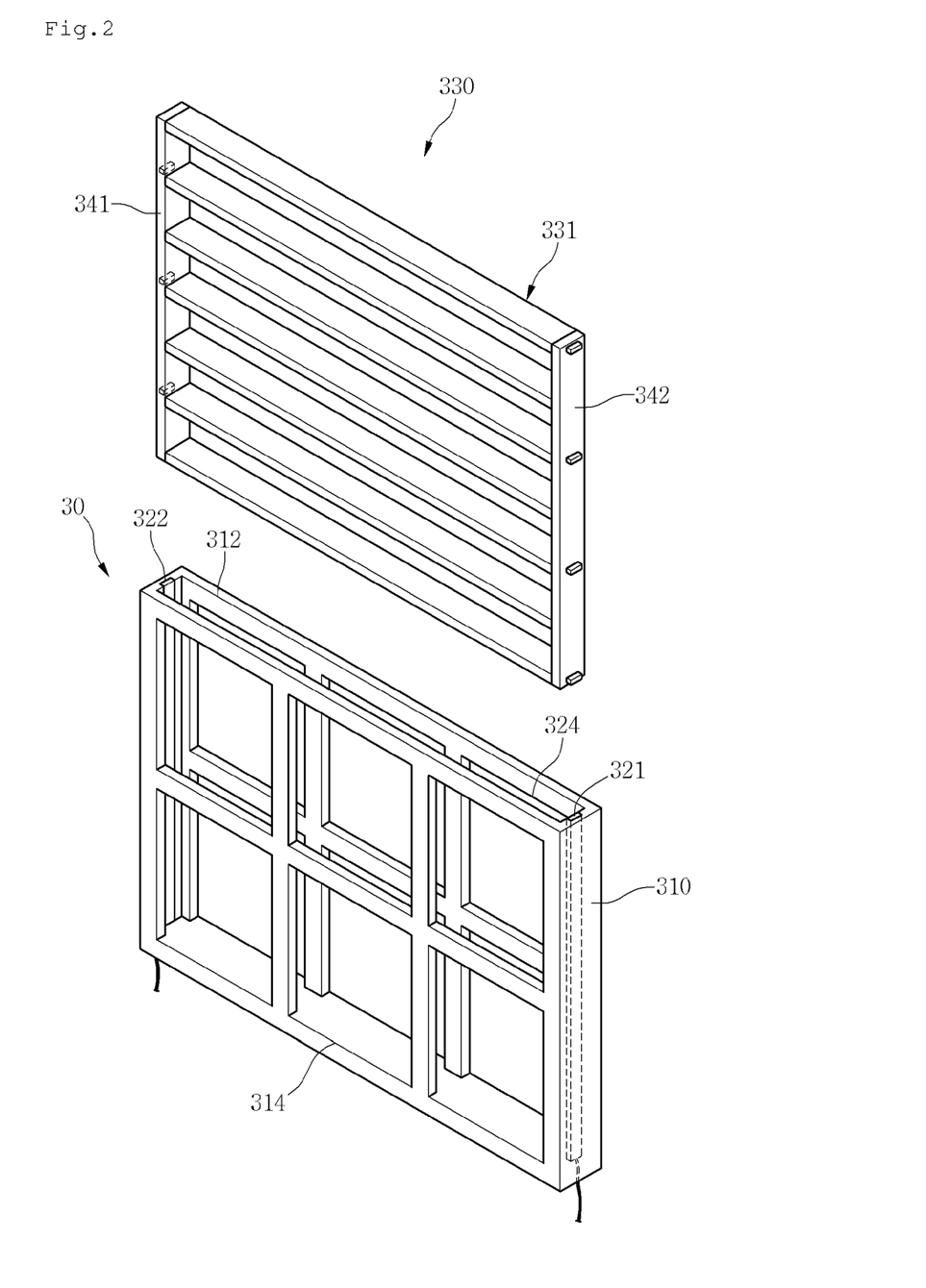
FIG. 2 is an exploded perspective view of a filter device according to the first embodiment.
Figure 3:
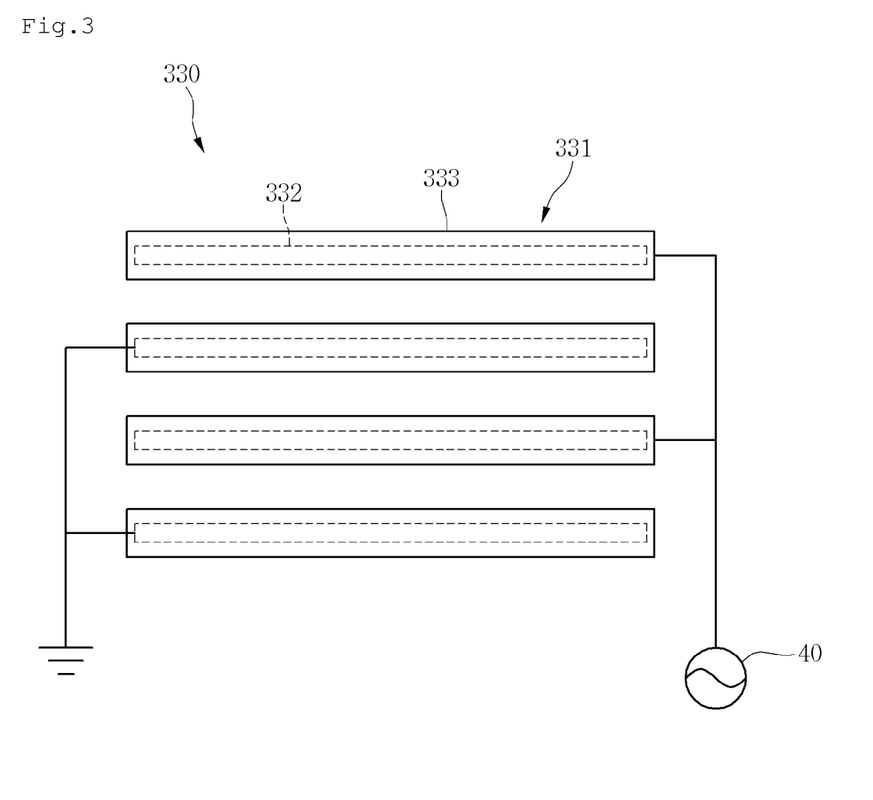
FIG. 3 is a schematic view illustrating a structure of a filter according to the first embodiment.

FIG. 2 is an exploded perspective view of the filter device according to the first embodiment, and FIG. 3 is a schematic view illustrating a structure of the filter according to the first embodiment.

Referring to FIGS. 2 and 3, the filter device 30 may include a filter 330 and a filter housing 310 supporting the filter 330.

The filter 330 may include a plurality of arrays 331 that are disposed to be spaced apart from each other. Since the plurality of arrays 331 are disposed to be spaced apart from each other, air may pass between the plurality of arrays 331.

Each of the plurality of arrays 331 may include a conductive member 332 and a dielectric layer 333 formed by coating a dielectric material on an outer surface of the conductive member 332.

The conductive member 332 may include carbon, carbon nano tube, or conductive polymer. For example, the conductive polymer may include poly(3,4-ethylenedioxythiophene) (PEDOT) or polypyrrole.

A 2n-th array of the plurality of arrays 331 may be connected to a power supply part 40, and a 2n+1-th array of the plurality of arrays 331 may be grounded.

The power supply part 40 may supply an AC or DC voltage to the filter 330. When the AC or DC voltage is supplied from the power supply part 40 to the filter 330, plasma discharge may occur between the plurality of arrays 331. Thus, the dust particles flowing between the plurality of arrays 331 may be attached to the dielectric layer 333 of each of the arrays 331 to clean the air. That is, the air may be cleaned by dielectric barrier discharge.

Both ends of the conductive member 332 of each of the arrays 331 are exposed to the outside of the dielectric layer 333, and support frames 341 and 342 are respectively coupled to both sides of each of the arrays 331. Also, both ends of the conductive member 332 pass through the support frames 341 and 342.

The filter housing 310 includes an accommodation part 312 for accommodating the filter 330. Also, the filter housing 310 include air holes 314 and 324 through which the air passes through the filter housing 310.

A first conductive plate 321 contacting the conductive member 332 of the 2n+1-th array of the filter 330 and a second conductive plate 322 contacting the conductive member 332 of the 2n-th array are disposed in the filter housing 310. Also, the first conductive plate 321 is grounded, and the second conductive plate 322 is connected to the power supply part 40.

The power supply part 40 may apply a low-frequency voltage or a high-frequency voltage to the filter 330. That is, in the current embodiment, the voltage supplied to the filter 330 may vary in frequency.

The power supply part 40 may initially supply the low-frequency voltage to the filter 330. Then, if it is determined that cleaning of the filter 330 is needed, the power supply part 40 may supply the high-frequency voltage to the filter 330.

Figure 4:
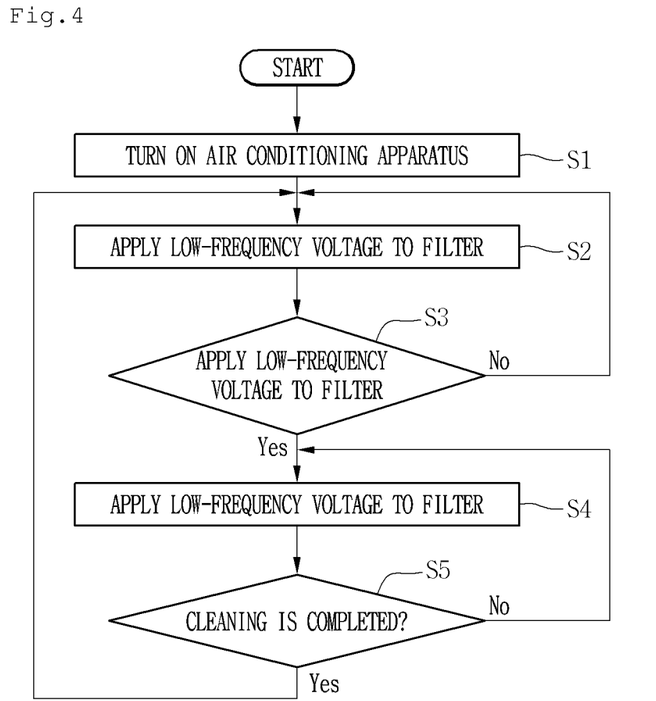
FIG. 4 is a flowchart for explaining a method of controlling the air conditioning apparatus according to the first embodiment.

FIG. 4 is a flowchart for explaining a method of controlling the air conditioning apparatus according to the first embodiment.

Referring to FIG. 4, the air conditioning apparatus 1 is turned on (S1), and thus an operation of the air conditioning apparatus 1 starts. Then, the fan 42 rotates to suction the indoor air into the main body 10 through the suction part 16. Also, a low-frequency DC or AC voltage is supplied into the filter 330 (S2).

At least one portion of the air suctioned through the suction part 16 passes through the filter device 30 before being heat-exchanged with the indoor heat exchanger 41. Particularly, the air may pass through the air hole 314 of the filter housing 310 and then pass between the plurality of arrays 331 constituting the filter. The plasma discharge may occur between the plurality of arrays 331, and thus, while the air passes through the plurality of arrays 331, the dust particles may be attached to the dielectric layer 333 of each of the arrays 333 to clean the air.

Also, the air passing through the filter 330 may be heat-exchanged with the indoor heat exchanger 41 and then discharged to the outside of the main body 10 through the discharge part 17.

During the operation of the air conditioning apparatus 1, a control part (not shown) determines whether a cleaning condition of the filter 300 is satisfied (S3).

In the current embodiment, the case in which the cleaning condition is satisfied may be a case in which a turn-on time of the air conditioning apparatus 1 reaches a reference time, a case in which the operation number of air conditioning apparatus 1 reaches a reference number, a case in which a difference between an upstream-side pressure and a downstream-side pressure of the filter device 30 with respect to the air flow reaches a reference pressure, or a case in which a load of a motor for rotating the fan 42 reaches a reference load. The difference between the upstream-side pressure and the downstream-side pressure of the filter device 30 may be,
for example, determined by a pressure sensor (not shown) disposed on a side of each of the suction part 16 and the discharge part 17.

Here, the reference time or the reference number may vary. For example, an amount of dust particles attached to the filter 330 may be relatively large in an area or country in which an amount of dusts is relatively large. Thus, since it is necessary to frequently clean the filter 330, the reference time or reference number may be set to a less value.

If an amount of dust particles attached to the filter 330 is large, the dust particles may resist a flow of the air. In addition, as an amount of dust particles increases, the difference between the upstream-side pressure and the downstream-side pressure of the filter device 30 may increase. Thus, when the difference between the upstream-side pressure and the downstream-side pressure of the filter device 30 reaches the reference pressure, it may be determined that the cleaning condition of the filter 330 is satisfied.

If the cleaning condition of the filter 300 is satisfied, the power supply part 40 supplies the high-frequency voltage to the filter 330 (S4).

In this specification, the low-frequency voltage (a voltage having a first frequency) may have a frequency of about 1 Khz or less, preferably, a frequency of about 10 hz or more, and the high-frequency voltage (a voltage having a second frequency) may have a frequency of about 1 Khz.

When the high-frequency voltage is supplied to the filter 330, organic particles in the dust particles attached to each of the arrays 331 may be burned, and inorganic particles in the dust particles may be separated from each of the arrays 331 to perform self-cleaning of each of the arrays 331.

The inorganic particles separated from each of the arrays 331 may drop into the dust storage part 50. Here, to minimize discharge of the dust particles separated from the filter 330 from the main body 10 during the cleaning of the filter 330, the operation of the fan 42 may be stopped during the cleaning of the filter 330, i.e., while the high-frequency voltage is supplied to the filter 330. However, when the operation of the fan 42 is stopped, information for informing the cleaning of the filter 330 may be displayed on a display part (not shown).

Alternatively, a rotation rate of the fan 42 may be reduced to a reference rotation rate that is a minimum rotation rate during the cleaning of the filter 330 to allow the dust particles separated from the filter 330 to drop into the dust storage part 50. That is, in the current embodiment, the current rotation rate of the fan 42 may be reduced during the cleaning of the filter 330 (including the case in which the operation of the fan 42 is stopped).

Also, the control part determines whether the cleaning of the filter 330 is completed (S5). For example, whether the cleaning of the filter 330 is completed may be determined according to whether the cleaning time (a time period for which the high-frequency voltage is supplied to the filter 330) of the filter 330 reaches a cleaning completion determination time.

If it is determined that the cleaning of the filter 330 is completed, the power supply part may supply the low-frequency voltage again to the filter 330 (returns to the operation S2).

According to the proposed embodiments, since the user does not separate the filter from the main body to perform the cleaning of the filter, but the dust particles are separated from the filter by the dielectric barrier discharge and then are collected into the dust storage part, user's convenience may be improved.

Also, since the dust particles separated from the filter are stored in the dust storage part, the discharge of the dust particles to the outside of the main body may be minimized.

Although the cleaning of the filter is performed during the operation of the air conditioning apparatus in the foregoing embodiment, the present disclosure is not limited thereto. For example, when it is determined that the cleaning condition of the filter is satisfied during the operation of the air conditioning apparatus, the filter may be automatically cleaned after the operation of the air conditioning apparatus is completed.

Alternatively, if it is determined that the cleaning condition of the filter is satisfied during the operation of the air conditioning apparatus, the information for informing the request of the filter cleaning may be displayed on the display part after the operation of the air conditioning apparatus is completed. Here, for example, when the user inputs a cleaning command by using a filter cleaning button, the filter cleaning may be performed.

Alternatively, the control part may determine whether the cleaning condition of the filter is satisfied after the operation of the air conditioning apparatus is completed. Then, if it is determined that the cleaning condition of the filter is satisfied, the filter may be automatically cleaned.

Figure 5:
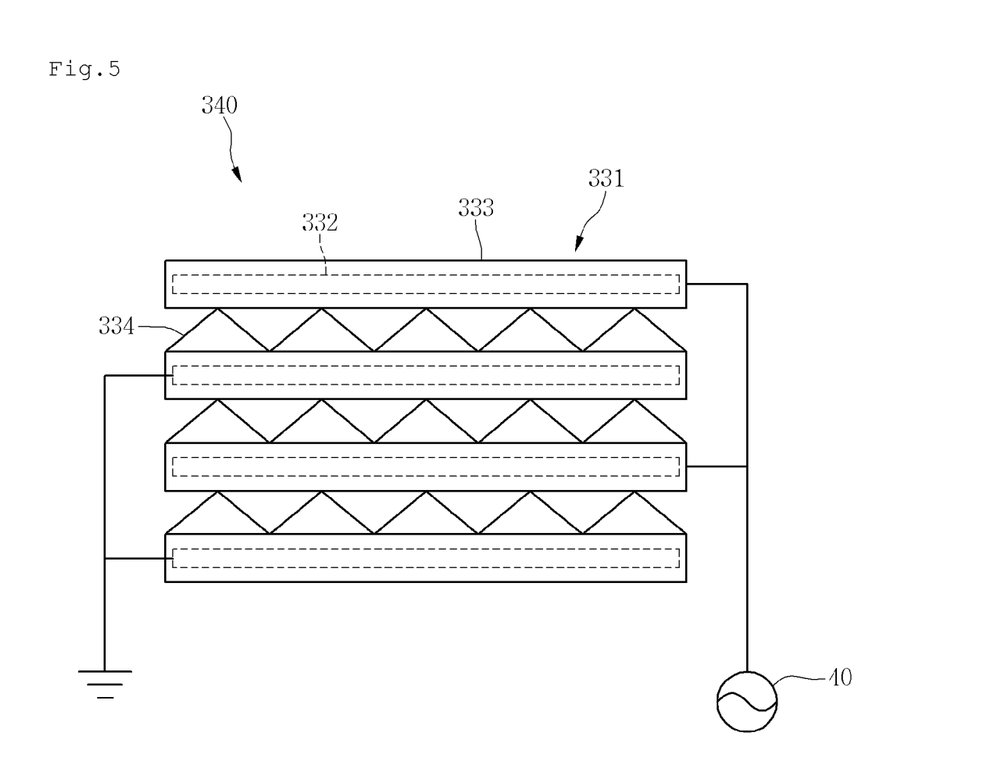
FIG. 5 is a schematic view of a filter according to a second embodiment.

FIG. 5 is a schematic view of a filter according to a second embodiment.

Referring to FIG. 5, a filter 340 according to a second embodiment may include a plurality of arrays 331 that are spaced apart from each other. The plurality of arrays 331 may include a conductive member 332 and a dielectric layer 333, like the plurality of arrays according to the first embodiment.

Also, the plurality of arrays 331 may be connected to each other by a connection member 334 that is coated with a dielectric material.

The connection member 334 may reduce a distance between the dielectric layers 333 of the arrays 331 to improve collection performance for dust particles.

The dust particles flowing between the dielectric layers 333 of each of the arrays 331 may be attached to the dielectric layers 333 of the arrays 331. Thus, if a distance between the dielectric layers 333 of the arrays 331 is too large, the dust particles may not be attached to the dielectric layers 333.

However, according to the current embodiment, since the dielectric layers 333 of the arrays 331 are connected to each other by using the connection member 334, a portion of the dust particles may be attached to the dielectric layers 333, and the other portion of the dust particles may be connected to the connection member 334 to improve the dust filtering performance.

The connection member 334 may be vertically or inclinedly connected to the plurality of arrays 331. Alternatively, the connection member 334 may have a wrinkled shape or wave shape to connect the plurality of arrays 331 to each other. That is, the connection member 334 may be bent several times.

In the current embodiment, unlike the first embodiment, both ends of the conductive member 332 of each of the arrays 331 may directly contact the first conductive plate and the second conductive plate of the filter housing, respectively.

Figure 6:
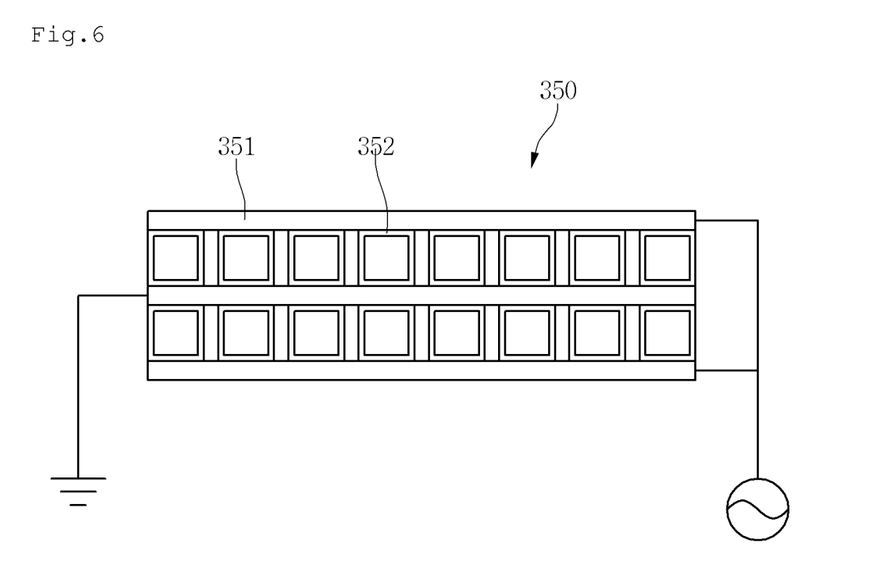
FIG. 6 is a schematic view of a filter according to a third embodiment.

FIG. 6 is a schematic view of a filter according to a third embodiment.

Referring to FIG. 6, a filter 350 according to the current embodiment may include a plurality of conductive members 351 that are spaced apart from each other and a plurality of dielectric tubes 352 disposed between the two conductive members 351 that are adjacent to each other. Each of the dielectric tubes 352 may have, for example, a square or rectangular shape. The plurality of dielectric tubes 352 may be disposed to be spaced apart from each other. The plurality of dielectric tubes 352 may contact the plurality of conductive members 351.

According to the current embodiment, a portion of air and dust particles may pass through each of the dielectric tubes 352, and a remaining portion of the air and dust particles may flow between the plurality of dielectric tubes 352.

Figure 7:
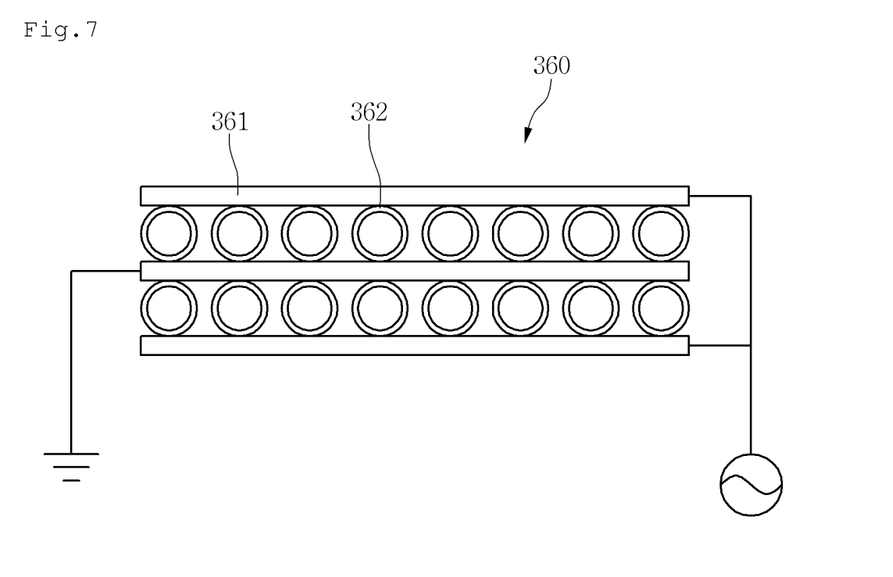
FIG. 7 is a schematic view of a filter according to a fourth embodiment.

FIG. 7 is a schematic view of a filter according to a fourth embodiment.

Referring to FIG. 7, a filter 360 according to the current embodiment may include a plurality of conductive members 361 that are spaced apart from each other and a plurality of dielectric tubes 362 disposed between the two conductive members 362 that are adjacent to each other. Each of the dielectric tubes 362 may have, for example, a circular or oval cross-section. The plurality of dielectric tubes 362 may be disposed to be spaced apart from each other. The plurality of dielectric tubes 362 may contact the plurality of arrays 361.

Figure 8:
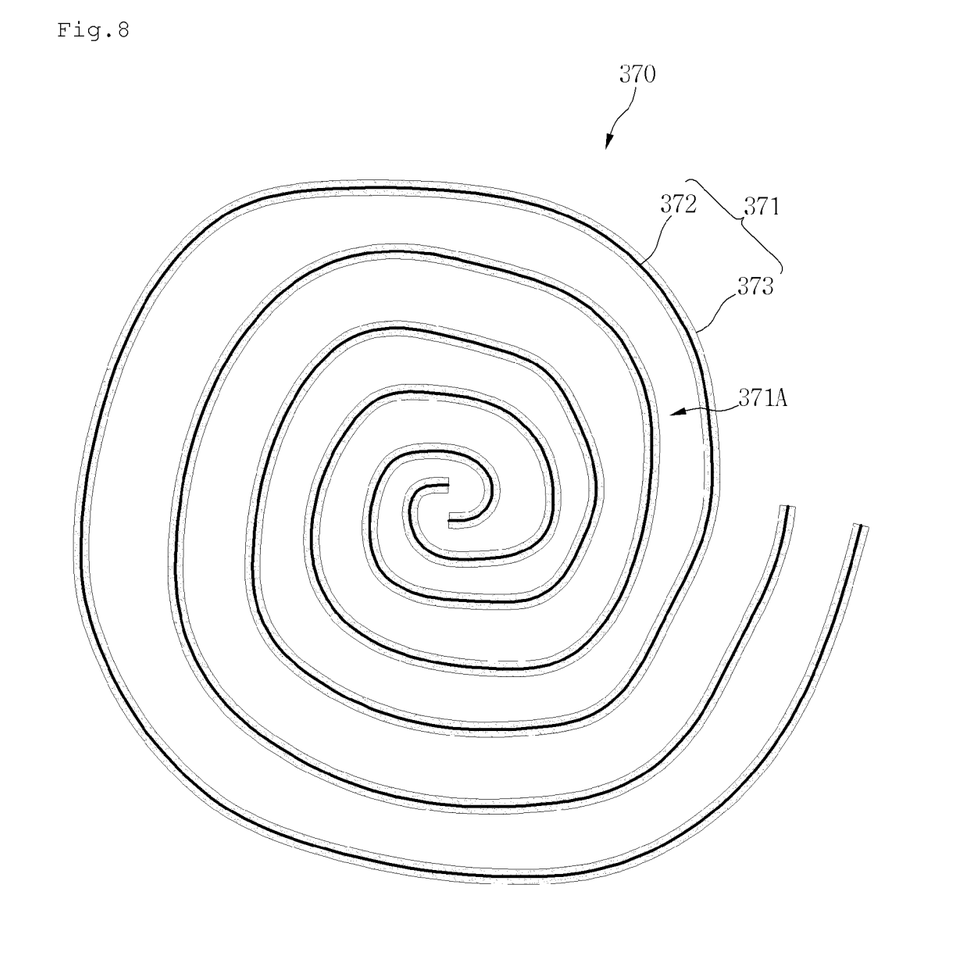
FIG. 8 is a schematic view of a filter according to a fifth embodiment.

FIG. 8 is a schematic view of a filter according to a fifth embodiment.

Referring to FIG. 8, a filter 370 according to the current embodiment may include a plurality of arrays 371 and 371A. The plurality of arrays 371 and 317A constituted by a conductive member 372 and a dielectric layer 373 may be disposed in a spiral shape.

The structure in which the plurality of arrays 371 and 371A are disposed in the spiral shape may be effective when a suction part through which air is suctioned has a circular shape.

Although a filter device 30 is applied to a wall-mount type indoor unit of various types of indoor units in the air conditioning apparatus in the foregoing embodiments, the present disclosure is not limited thereto. For example, the filter device 30 may be equally applied to other types of indoor units. For example, in case of an indoor unit of a standing-type air conditioner (i.e., an indoor unit that is placed on the floor), the filter device may be installed on a suction grill or an indoor heat exchanger. Also, in case of an indoor unit of a ceiling-type air conditioner, the filter device may also be installed on a suction gill or an indoor heat exchanger.

In case of an air cleaner, the filter device may be installed on a suction gill or a heat exchanger (if the product includes a heat exchanger).

According to an additional embodiment, since dust particles have to be electrically charged to attach the dust particles to a filter, a diffusion discharge device for electrically discharging air and dusts may be disposed on a side of the suction part so as to effectively attach the dust particles to the filter.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioning apparatus comprising:
a main body having a suction part and a discharge part, air being suctioned through the suction part and discharged through the discharge part;
a fan within the main body to allow the air to flow;
a filter device between the suction part and the discharge part within the main body, the filter device comprising an array of filter elements separated from each other,
each of the filter elements comprises a conductive member that contacts a dielectric containing a dielectric material; and
a controller to control a power supply that supplies a voltage to more than one of the filter elements,
wherein the controller controls the power supply such that:
the power supply supplies a first voltage having a first frequency to the more than one of the filter elements to filter dust, the first frequency being less than 1 Khz, and
the power supply supplies a second voltage having a second frequency to the more than one of the filter elements for cleaning, the second frequency being greater than 1 Khz.

2. The air conditioning apparatus according to claim 1, wherein the conductive member is coated with the dielectric.

3. The air conditioning apparatus according to claim 1, wherein, when the power supply supplies the second voltage having the second frequency to the more than one of the filter elements, the controller controls the fan such that
a current rotation rate of the fan is reduced.

4. The air conditioning apparatus according to claim 1, wherein the controller controls the power supply such that the power supply supplies the second voltage having the second frequency to the more than one of the filter elements after the operation of the air conditioning apparatus is completed.

5. The air conditioning apparatus according to claim 1, further comprising:
a display to display information for request of the filter cleaning is displayed; and
an inputter to input a filter cleaning command,
wherein, when the filter cleaning command is inputted through the inputter, the controller controls the power supply such that the power supply supplies the second voltage having the second frequency to the more than one of the filter elements.

6. The air conditioning apparatus according to claim 1, wherein the filter device further comprises a filter housing in which the filter elements are accommodated, and
a first conductive plate contacting a conductive member of a 2n-th array of the filter elements and a second conductive plate contacting a conductive member of a 2n+1-th array of the filter elements are disposed in the filter housing.

7. The air conditioning apparatus according to claim 1, wherein the first frequency is less than or equal to 10 hz.

8. The air conditioning apparatus according to claim 1, further comprising a dust storage part storing dust particles that may be separated from the filter elements.

* * * * *